(12) United States Patent
Parthasarathy et al.

(10) Patent No.: US 11,093,555 B2
(45) Date of Patent: Aug. 17, 2021

(54) DETERMINING CORRELATIONS BETWEEN LOCATIONS ASSOCIATED WITH A LABEL AND PHYSICAL LOCATIONS BASED ON INFORMATION RECEIVED FROM USERS PROVIDING PHYSICAL LOCATIONS TO AN ONLINE SYSTEM

(71) Applicant: Facebook, Inc., Menlo Park, CA (US)

(72) Inventors: Abhishek Parthasarathy, San Francisco, CA (US); Aaron Bryan Adcock, New York, NY (US); Jan Kodovsky, Rochester, NY (US); Konrad Komorowski, London (GB)

(73) Assignee: Facebook, Inc., Menlo Park, CA (US)

( * ) Notice: Subject to any disclaimer, the term of this patent is extended or adjusted under 35 U.S.C. 154(b) by 410 days.

(21) Appl. No.: 15/640,374

(22) Filed: Jun. 30, 2017

(65) Prior Publication Data

US 2019/0005157 A1 Jan. 3, 2019

(51) Int. Cl.
*G06F 16/907* (2019.01)
*G06F 16/29* (2019.01)
*G06F 16/487* (2019.01)

(52) U.S. Cl.
CPC ............ *G06F 16/907* (2019.01); *G06F 16/29* (2019.01); *G06F 16/487* (2019.01)

(58) Field of Classification Search
CPC ....... G06F 16/907; G06F 16/487; G06F 16/29
USPC .......................................................... 707/740
See application file for complete search history.

(56) References Cited

U.S. PATENT DOCUMENTS

| | | | | |
|---|---|---|---|---|
| 9,262,475 | B2* | 2/2016 | Bernier | G06F 16/2453 |
| 2005/0182561 | A1* | 8/2005 | Yamada | G06F 16/29 |
| | | | | 701/533 |
| 2006/0143606 | A1* | 6/2006 | Smith | G06F 21/629 |
| | | | | 717/175 |
| 2012/0136722 | A1* | 5/2012 | Kothiwal | G06Q 30/0241 |
| | | | | 705/14.54 |
| 2012/0166432 | A1* | 6/2012 | Tseng | G06F 16/24578 |
| | | | | 707/728 |
| 2013/0210462 | A1* | 8/2013 | Busch | H04L 67/18 |
| | | | | 455/456.3 |
| 2013/0340094 | A1* | 12/2013 | Majeti | H04L 51/30 |
| | | | | 726/28 |
| 2014/0012909 | A1* | 1/2014 | Sankar | G06F 16/29 |
| | | | | 709/204 |

(Continued)

*Primary Examiner* — Ashish Thomas
*Assistant Examiner* — Abdullah A Daud
(74) *Attorney, Agent, or Firm* — Fenwick & West LLP (57) ABSTRACT

An online system maintains various labels identifying physical locations, allowing users to identify a physical location to the online system by specifying the label identifying the physical location. When a user does not identify a label corresponding to location coordinates provided to the online system by a client device, the online system selects a maintained label and prompts the user to indicate whether the user visited the physical location identified by the selected label. To select the label, the online system accounts for likelihoods of the received location coordinates being identified by various labels and values of the online system of identifying whether different labels identify received location coordinates. The online system may also account for other prompts presented to the user or to other users when determining whether to prompt the user to indicate whether the user visited the physical location identified by the selected label.

18 Claims, 3 Drawing Sheets

(56) References Cited

U.S. PATENT DOCUMENTS

| | | | |
|---|---|---|---|
| 2015/0026718 A1* | 1/2015 | Seyller | H04N 21/4725 725/34 |
| 2015/0186417 A1* | 7/2015 | Olteanu | G06Q 50/01 707/748 |
| 2015/0332296 A1* | 11/2015 | Chu | G06Q 30/0202 705/7.33 |
| 2016/0091319 A1* | 3/2016 | Bonnell | G01C 21/3623 701/461 |
| 2016/0381154 A1* | 12/2016 | Apreleva | H04L 67/18 709/205 |
| 2017/0064412 A1* | 3/2017 | Taxier | H04N 21/4882 |
| 2017/0323340 A1* | 11/2017 | Jeon | H04L 67/20 |
| 2017/0354795 A1* | 12/2017 | Blahnik | G06F 3/011 |
| 2018/0041571 A1* | 2/2018 | Rogers | H04L 67/22 |
| 2018/0174130 A1* | 6/2018 | Shroff | G06Q 20/34 |
| 2018/0224284 A1* | 8/2018 | Danford | H04W 4/38 |
| 2018/0330336 A1* | 11/2018 | Chittaluru | G06Q 10/1095 |
| 2018/0338218 A1* | 11/2018 | Chen | H04L 67/26 |
| 2018/0349954 A1* | 12/2018 | Mehta | H04L 67/18 |

* cited by examiner

DETERMINING CORRELATIONS BETWEEN LOCATIONS ASSOCIATED WITH A LABEL AND PHYSICAL LOCATIONS BASED ON INFORMATION RECEIVED FROM USERS PROVIDING PHYSICAL LOCATIONS TO AN ONLINE SYSTEM

BACKGROUND

This disclosure relates generally to information maintained by an online system for users, and more specifically to correlating physical location information of users with locations associated with labels by the online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

When presenting content to various users, many online systems account for locations associated with users. For example, various content items identify physical locations, and an online system selects these content items for presentation to users when the online set obtained information indicating physical locations of the users are within a threshold distance of physical locations identified by the content items. Many online systems associate labels with physical location coordinates of various physical locations, allowing users to more easily identify to the online system when they are at the physical location coordinates by identifying a label associated with the physical location coordinates to the online system.

While allowing users to specify labels instead of physical location coordinates simplifies user identification of physical locations to the online system, users may neglect to identify various physical locations to the online system. For example, when visiting certain businesses, users may fail to identify a label associated with the physical location of the business to the online system. This limits information received by the online system about user activity at various physical locations, which affects content presented to various users by the online system. For example, users failing to identify a label associated with a business to the online system may not be presented with relevant content about the business tailored for presentation to users who have visited a physical location corresponding to the label. This reduction in content presented to users based on user location or limited information about user visits to physical locations may discourage certain users from providing content to the online system for presentation, reducing overall user interaction with the online system.

SUMMARY

An online system maintains various labels that each identify a location. For example, users identify a physical location associated with the user and a label identifying the physical location associated with the user, so the label is presented in conjunction with the physical location. In a specific example, a user specifies a physical location of a retail location of the user and associates a label identifying the retail location with the physical location in a user profile for the user. Subsequently, another user may provide the label to the online system, and the online system 140 identifies the physical location from the provided label. Maintaining various labels allows users to more easily identify physical locations to the online system by providing the labels, which increases an amount of information the online system obtains from users for association with the physical locations identified by various labels. For example, a label identifying a location allows users to easily check-in to the location via the online system by selecting the label via the online system or by identifying the label to the online system.

However, the online system may receive limited information from users identifying a label, even when the users' physical locations correspond to the location identified by the label. For example, a user may physically be at a physical location with a client device, but does not identify the physical location to the online system. As an example, a user is at a physical location of a retail location that is identified by a label, but does not identify the label to the online system, the online system is unable to maintain information identifying that the user was at the physical location identified by the label. This limits information available to a user who specified the label identifying the physical location. Such limited information impairs an ability of the user who specified the label to leverage information from the online system about users visiting the physical location identified by the label. For example, without users identifying the label identifying the physical location to the online system, the user specifying the label is unable to accurately evaluate effectiveness of content presented to online system users in causing the online system users to visit the physical location identified by the label. As another example, without users identifying the label identifying the physical location to the online system, the user specifying the label is unable to accurately target content to users who have visited the physical location identified by the label.

Even if a user does not expressly identify a physical location to the online system, the online system may receive location coordinates (e.g., latitude and longitude) from a client device. In various embodiments, an application associated with the online system executes on the client device and the user authorizes the application to provide location coordinates of the client device to the online system. The user may regulate a frequency with which the client device provides location coordinates of the client device to the online system or otherwise regulate when the online system receives location coordinates from the client device. The online system may receive various types of location coordinates from the client device. For example, the location coordinates are a latitude and a longitude of the client device. Other types of location coordinates include information from the client device identifying wireless devices within a threshold distance of the client device and one or more metrics describing strength of wireless signals received by the client device from the other wireless devices. The wireless signals received by the client device may be BLUETOOTH®, 802.11, or any other suitable type of wireless signal. In a particular example, the online system receives information from the client device identifying one or more wireless beacons or access points within a threshold distance of the client device, as well as metrics describing strengths of wireless signals the client device receives from the identified wireless beacons or access points. Based on the physical locations and the metrics, the online system determines a physical location of the client device. Other information may be received by the online system in conjunction with the location coordinates from the client device. For example, the client device provides the online system with an estimated accuracy of location coordinates from the client device, a rate at which the client device is moving, a direction in which the client device is moving, or any other suitable information.

From location coordinates received from the client device, the online system determines a particular physical location corresponding to location coordinates where the client device remained for at least a threshold amount of time. In various embodiments, the online system retrieves location coordinates received from the client device within a specific time interval and determines a centroid of the retrieved location coordinates. The online system determines an average distance between the retrieved location coordinates and the centroid, and determines the particular physical location as the centroid if the average distance is less than a threshold distance. In various embodiments, the specific time interval is a specific duration from a time when location coordinates were received by the online system. For example, the online system initially identifies location coordinates and retrieves other location coordinates received within a threshold amount of time from a time when the initially identified location coordinates were received by the online system. In some embodiments, the online system 140 compares received location coordinates with location coordinates included in a user profile and discards received location coordinates matching, or within a threshold distance of, location coordinates stored in the user profile when determining the particular physical location.

The online system retrieves one or more models associated with various maintained labels, where a model associated with a label determines a likelihood of location coordinates being associated with a physical location identified by the label. One or more of the models are applied to the particular physical location to determine likelihoods of one or more labels identifying the particular physical location. For example, the online system determines a likelihood of each of one or more labels identifying the particular physical location. In various embodiments, the online system stores likelihoods of different labels identifying the particular physical location of the set and information identifying labels corresponding to different likelihoods in association with the particular physical location.

Additionally, the online system retrieves values to the online system of identifying whether received location coordinates are identified by each of at least a set of labels maintained by the online system. A value to the online system of determining whether received location coordinates are identified by a label may represent an expected revenue to the online system from a user who specified the label, an expected increase in user interaction with content presented by the online system accounting for the label, or any other suitable value. The online system may determine the value of identifying whether a received physical location is identified by a label based on prior revenue received from a user specifying the label or based on content presented to users based on the users being identified as associated with location coordinates within a threshold distance of a physical location identified by the label.

Based on the determined likelihoods and the values to the online system of identifying whether received location coordinates are identified by various labels, the online system selects a label maintained by the online system. In one embodiment, the online system determines expected values for various labels and ranks the labels based on the expected values. The expected value for a label is a product of a likelihood of the label identifying location coordinates corresponding to the particular physical location and a retrieved value to the online system of determining whether location coordinates are identified by the label. In some embodiments, the online system ranks labels by their expected value and selects a label having at least a threshold position in the ranking.

Subsequently, the online system provides a prompt to the client device for presentation to the user that identifies the selected label and information identifying the selected physical location. The prompt also requests the user to indicate whether to associate the particular physical location with the selected label. For example, the prompt identifies a time corresponding to when the online system received location coordinates corresponding to the particular physical location and identifies the label or a description of the selected label and prompts the user to confirm whether the user was at the physical location identified by the selected label at the time corresponding to when the online system received the location coordinates corresponding to the particular physical location. To prevent presentation of the prompt from decreasing user interaction with the online system, the online system applies various criteria to the prompt that regulate presentation of the prompt to the user in various embodiments. For example, the online system maintains a threshold duration between presentations of prompts to indicate whether to associate physical locations corresponding to location coordinates received from client devices associated with the user with one or more labels. Hence, the online system determines a time when another prompt to associate a physical locations corresponding to location coordinates received from client devices associated with the user with a label, and provides the prompt to the client device at a time at least the threshold duration from the time when the other prompt was presented to the user. In some embodiments, the online system waits the threshold duration and an additional interval, which may be varied over time, from a time when another prompt was previously presented to the user to provide 340 the prompt to the client device for presentation.

Additionally, the online system may account for presentation of prompts to additional users when providing the prompt to the client device. For example, the online system identifies one or more additional users connected to the user via the online system. The online system identifies content presented by the online system to the additional users connected to the user. If the online system determines an additional prompt that identified the selected label and requested the additional user to indicate whether to associate the particular physical location with the label was previously presented to an identified additional user, the online system withholds the prompt from the client device. This allows the online system to leverage prompts presented to additional users connected to the user to limit presentation of prompts to the user while also obtaining information about whether a label identifies the particular physical location.

Based on a response to the prompt received from the user, the online system stores information indicating whether the user was at the physical location identified by the selected label based on the received response. Additionally, the online system modifies the model that determines a likelihood of location coordinates being identified by the selected label based on the received response. This allows the online system to improve an accuracy of the model determining the likelihood of location coordinates being identified by the selected label based on responses from various users to prompts about whether location coordinates received from client devices associated with the users are identified by the selected label. The online system modifies the model determining the likelihood of location coordinates being identified by the selected label until the model has a minimum accuracy. Subsequently, the online system applies the model to received location coordinates to identify when users are at the physical location identified by the label, allowing the online system to provide a user who specified the label with increased information about online system users who visit the physical location identified by the label.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
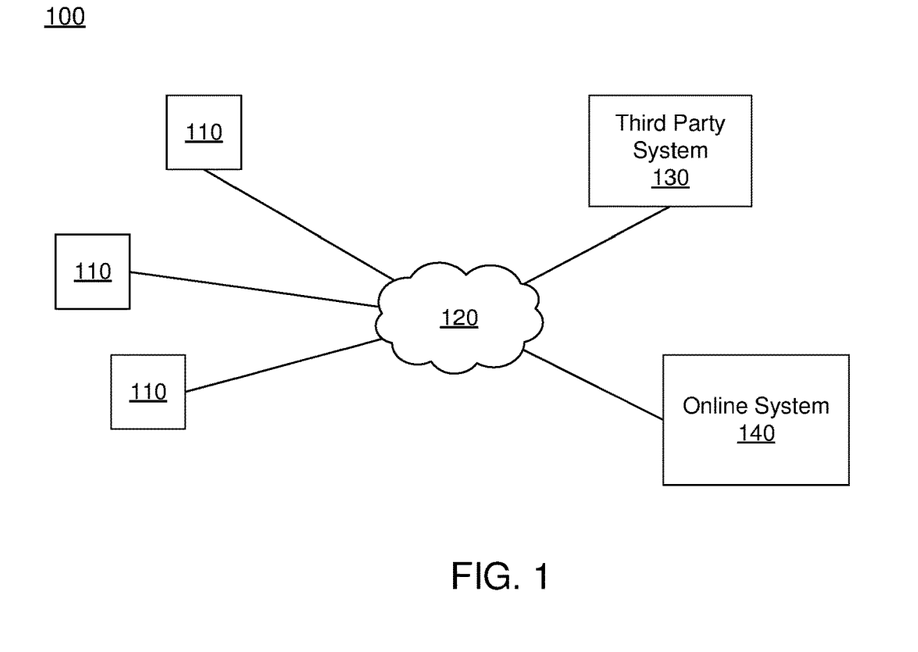
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
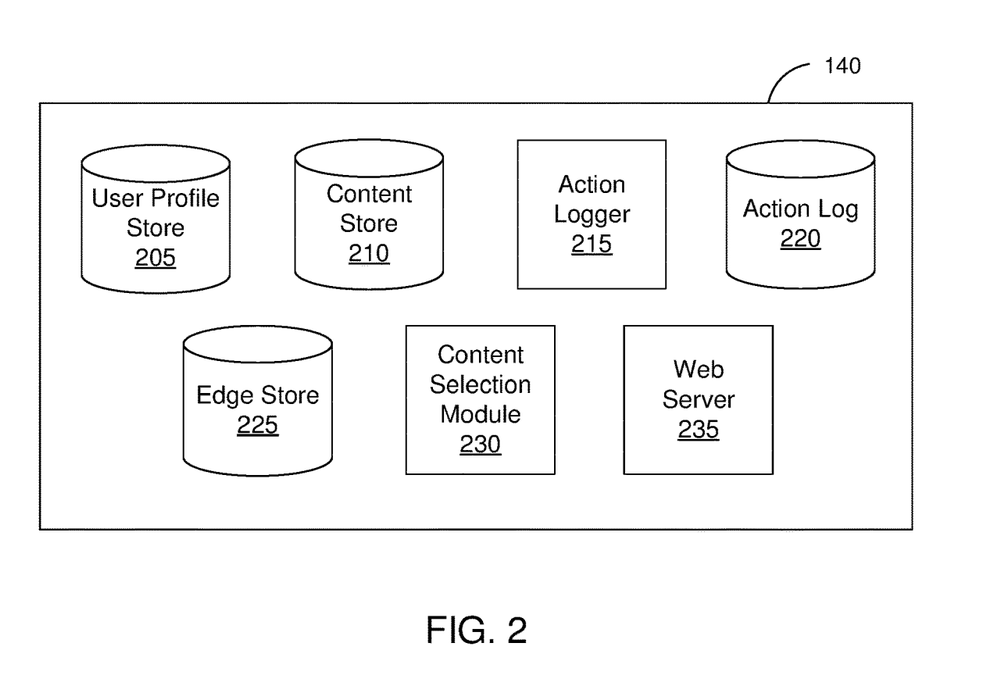
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

Various user profiles may include information identifying physical locations. For example, a user includes physical location coordinates (e.g., latitude and longitude, street address) in the user profile for the user identifying physical locations where a user spends particular amounts of time. For example, the user includes physical location coordinates in the user profile corresponding to the user's home address or to the user's work address. The user may specify a label corresponding to physical location coordinates in the user profile, allowing the user to identify the physical location coordinates by identifying the label to the online system. Referring to the previous example, the user may associate the text "Home" with physical location coordinates identifying the user's home address and the text "Work" with physical location coordinates identifying the user's work address. Subsequently, providing the online system 140 with the text "Home" allows the user to identify the user's home address to the online system 140. A user may include any number of physical location coordinates in the user's user profile, and associate any suitable label with the physical location coordinates. For example, if a user is a business having multiple retail locations, the user includes physical location coordinates of each retail location in the user's user profile and associates a label with each physical location coordinates (e.g., a retail location name or identifier), allowing the user or another user to identify physical location coordinates of a specific retail location to the online system 140 by identifying the label corresponding to the physical location coordinates of the specific retail location to the online system 140.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed includes content items such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed including a plurality of content items selected for presentation to the user. The content selection module 230 may also determine the order in which selected content items are presented via the feed. For example, the content selection module 230 orders content items in the feed based on likelihoods of the user interacting with various content items.

In various embodiments, the online system 140 maintains various models that determine likelihoods of location coordinates (e.g., latitude and longitude) received from a client device 110 being identified by various labels specifying physical locations included in user profiles maintained by the user profile store 205. The models allow the content selection module 230 to identify users who have visited the location coordinates identified by a label even when the label is not identified to the online system 140, increasing an amount of information available to a user associated with a user profile including the label, which may affect content items provided by the user to the online system 140 for presentation by the content selection module 230. To improve accuracies of the maintained models, the content selection module 230 provides prompts to users to indicate whether various labels identify location coordinates received from client devices 110 associated with the users, as further described below in conjunction with FIGS. 3 and 4.

When prompting a user associated with a client device 110 from which the online system 140 received location coordinates without identifying a label, the content selection module 230 accounts for values to the online system of identifying whether received location coordinates are identified by various labels and likelihoods of the received location coordinates being identified by various labels, determined by applying the various models to the received location coordinates. A value to the online system of determining whether received location coordinates are identified by a label may represent an expected revenue to the online system from a user who specified the label, an expected increase in user interaction with content presented by the online system accounting for the label, or any other suitable value, as further described below in conjunction with FIG. 3. Based on the values and the likelihoods, the content selection module 230 determines expected values of determining whether different labels identify the received location coordinates and selects a label based on the expected values, as further described below in conjunction with FIG. 3.

To modify the model determining likelihoods of location coordinates being identified by the selected label, the content selection module 230 generates a prompt identifying the selected label and prompting the user to indicate whether the received location coordinates correspond to a physical location identified by the selected label. For example, the prompt includes information identifying the label and information identifying a time when the online system received the location coordinates and prompts the user to indicate whether the user was at the physical location identified by the selected label at the identified time. Presentation of the prompt to the user is further described below in conjunction with FIG. 3.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
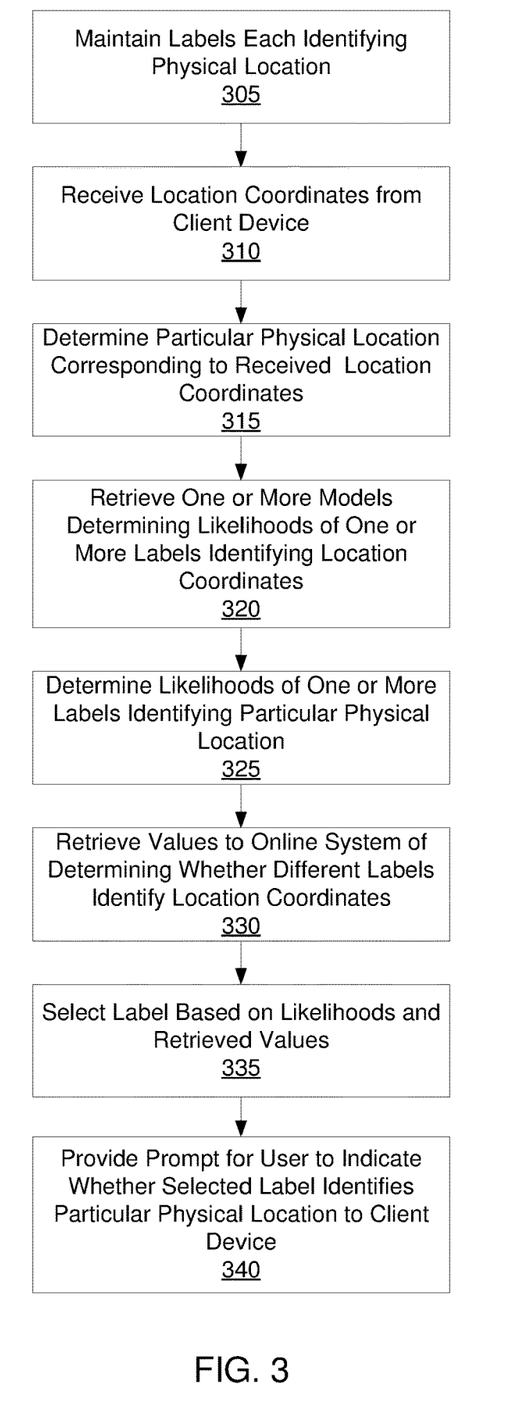
FIG. 3 is a flowchart of a method for an online system to associate a label identifying a location with location coordinates received from a client device, in accordance with an embodiment.

Determining Labels for Locations Identifying Physical Locations Identified by a User FIG. 3 is a flowchart of one embodiment of a method for an online system 140 to associate a label identifying a location with location coordinates received from a client device 110. In various embodiments, the steps described in conjunction with FIG. 3 may be performed in different orders. Additionally, in some embodiments, the method may include different and/or additional steps than those shown in FIG. 3.

The online system 140 maintains 305 various labels that each identify a physical location. For example, users identify a physical location associated with the user and a label identifying the physical location associated with the user, so the label is presented in conjunction with the physical location. For example, a user specifies a physical location of a retail location of the user and associates a label identifying the retail location with the physical location in a user profile for the user. Subsequently, another user may provide the label to the online system 140, and the online system 140 identifies the physical location from the provided label. By maintaining 305 various labels, the online system 140 allows users to more easily identify physical locations by providing the labels, which increases an amount of information the online system 140 obtains from users for association with the physical locations identified by various labels. For example, a label identifying a location allows users to easily check-in to the location via the online system 140 by selecting the label via the online system 140 or by identifying the label to the online system 140.

However, the online system 140 may receive limited information from users identifying a label, even when the users' physical locations correspond to the location identified by the label. For example, a user may physically be at a physical location with a client device 110, but not identify the physical location to the online system 140. As an example, a user is at a physical location of a retail location that is identified by a label, but does not identify the label to the online system 140, the online system 140 is unable to maintain information identifying that the user was at the physical location identified by the label. This limits information available to a user who specified the label identifying the physical location. Such limited information impairs an ability of the user who specified the label to leverage information from the online system 140 about users visiting the physical location identified by the label. For example, without users identifying the label identifying the physical location to the online system 140, the user specifying the label is unable to accurately evaluate effectiveness of content presented to online system users in causing the online system users to visit the physical location identified by the label. As another example, without users identifying the label identifying the physical location to the online system 140, the user specifying the label is unable to accurately target content to users who have visited the physical location identified by the label.

The online system 140 receives 310 location coordinates (e.g., latitude and longitude) from a client device 110 even when the user does not identify a label identifying a physical location to the online system 110. In various embodiments, an application associated with the online system 140 executes on the client device 110 and the user authorizes the application to provide location coordinates of the client device 110 to the online system 140. The user may regulate a frequency with which the client device 110 provides location coordinates of the client device 110 to the online system 140. In some embodiments, the online system 140 requests location coordinates of the client device 110 from the client device 110, which transmits the location coordinates to the online system 140, subject to user settings, in response to receiving the requests from the online system 140. Alternatively, the client device 110 transmits location coordinates to the online system 140 at intervals specified by the user or when criteria specified by the user are satisfied. In some embodiments, the online system 140 stores location coordinates received 310 from the client device 110. Alternatively, the online system 140 stores location coordinates received 310 from the client device 110 for a specific time interval, then deletes the location coordinates.

The online system 140 may receive 310 various types of location coordinates from the client device 110. For example, the location coordinates are a latitude and a longitude of the client device 110. Other types of location coordinates include information from the client device 110 identifying wireless devices within a threshold distance of the client device 110 and one or more metrics describing strength of wireless signals received by the client device 110 from the other wireless devices. The wireless signals received by the client device 110 may be BLUETOOTH®, 802.11, or any other suitable type of wireless signal. In a particular example, the online system 140 receives 310 information from the client device 110 identifying one or more wireless beacons or access points within a threshold distance of the client device 110, as well as metrics describing strengths of wireless signals the client device 110 receives from the identified wireless beacons or access points. Based on the physical locations and the metrics, the online system 140 determines a physical location of the client device 110. Other information may be received 310 by the online system 140 in conjunction with the physical location coordinates from the client device 110. For example, the client device 110 provides the online system 140 with an estimated accuracy of location coordinates from the client device 110, a rate at which the client device 110 is moving, a direction in which the client device 110 is moving, or any other suitable information.

From location coordinates received from the client device 110, the online system 140 determines 315 a particular physical location that corresponds to location coordinates where the client device 110 remained for at least a threshold amount of time. In various embodiments, the online system 140 retrieves location coordinates received 310 from the client device 110 within a specific time interval and determines a centroid of the retrieved location coordinates. The online system 140 determines an average distance between the retrieved location coordinates and the centroid, and determines 315 the particular physical location as the centroid if the average distance is less than a threshold distance. Alternatively, the online system 140 determines distances between each of the retrieved location coordinates and the centroid and determines 315 the centroid as the particular physical location if at least a threshold amount of the determined distances are less than the threshold distance. In various embodiments, the specific time interval is a specific duration from a time when location coordinates were received 310 by the online system 140. For example, the online system 140 initially identifies location coordinates and retrieves other location coordinates received within a threshold amount of time from a time when the initially identified location coordinates were received 310 by the online system 140.

Additionally, when determining 315 the particular physical locations, the online system 140 compares received location coordinates with physical location coordinates included in a user profile. In various embodiments, the user provides the online system 140 with physical location coordinates of certain physical locations that the online system 140 maintains in the user profile of the user. For example, the online system 140 stores physical location coordinates of the user's home and physical location coordinates of the user's workplace in the user profile of the user. The online system 140 compares received location coordinates to physical location coordinates stored in the user profile of the user and discards received location coordinates matching, or within a threshold distance of, physical location coordinates stored in the user profile of being identified as the particular physical location. This prevents the online system 140 from accounting for location coordinates corresponding to physical locations where the client device 110 is frequently likely to be for greater than the threshold amount of time.

The online system 140 retrieves 320 one or more models associated with various maintained labels, where a model associated with a label determines a likelihood of location coordinates being associated with a physical location identified by the label. In some embodiments, the online system 140 maintains a model associated with each label. Alternatively, the online system 140 maintains a model that is applied to location coordinates and a physical location to determine a likelihood of the location coordinates identifying the physical location.

One or more of the models are applied to the particular physical location to determine 325 likelihoods of one or more labels identifying the particular physical location. For example, the online system 140 determines 325 a likelihood of each of one or more labels identifying the particular physical location. The online system 140 may apply a model associated with each of the one or more labels to physical location coordinates corresponding to the particular physical location to determine 325 likelihoods of each of the one or more labels identifying the particular physical location. In various embodiments, the online system 140 stores likelihoods of different labels identifying the particular physical location of the set and information identifying labels corresponding to different likelihoods in association with the particular physical location.

Additionally, the online system 140 retrieves 330 values to the online system 140 of identifying whether received location coordinates are identified by each of at least a set of labels maintained 305 by the online system 140. A value to the online system 140 of determining whether received location coordinates are identified by a label may represent an expected revenue to the online system from a user who specified the label, an expected increase in user interaction with content presented by the online system 140 accounting for the label, or any other suitable value. The online system 140 may determine the value of identifying whether a received physical location is identified by a label based on prior revenue received from a user specifying the label or based on content presented to users based on the users being identified as associated with location coordinates within a threshold distance of a physical location identified by the label. The values may be retrieved 330 from information stored by the online system 140 or retrieved 330 from users who specified various labels.

Based on the determined likelihoods and the values to the online system 140 of identifying whether received location coordinates are identified by various labels, the online system 140 selects 335 a label maintained by the online system 140. In one embodiment, the online system 140 determines expected values for various labels and ranks the labels based on the expected values. The expected value for a label is a product of a likelihood of the label identifying location coordinates corresponding to the particular physical location and a retrieved value to the online system 140 of determining whether physical coordinates are identified by the label. In some embodiments, the online system 140 selects 335 a label having a maximum expected value or having at least a threshold expected value. Alternatively, the online system 140 ranks labels by their expected value and selects 335 a label having at least a threshold position in the ranking. As another example, the online system 140 determines a ranking of labels based on their likelihoods of identifying location coordinates corresponding to the particular physical location and determines an additional ranking of labels based on their values to the online system 140 of determining whether physical coordinates are identified by various label. The online system 140 selects 335 a label based on the ranking and the additional ranking. For example, the online system 140 selects 335 a label having at least a threshold position in the ranking based on likelihoods and at least an additional threshold position in the additional ranking based on values to the online system 140.

Subsequently, the online system 140 provides 340 a prompt to the client device 110 for presentation to the user that identifies the selected label and information identifying the selected physical location. The prompt also requests the user to indicate whether to associate the particular physical location with the selected label. For example, the prompt identifies a time corresponding to when the online system 140 received 310 location coordinates corresponding to the particular physical location and identifies the label or a description of the selected label and prompts the user to confirm whether the user was at the physical location identified by the selected label at the time corresponding to when the online system 140 received 310 the location coordinates corresponding to the particular physical location. The online system 140 may include the prompt in a feed of content selected by the online system 140 for presentation to the user in some embodiments. Alternatively, the online system 140 provides 340 the prompt to the client device 110 for presentation in a specific location within an application executing on the client device 110 and associated with the online system 140. For example, the application executing on the client device 110 and associated with the online system 140 presents the prompt in a particular portion of a display of the client device 110 when the user accesses the application.

To prevent presentation of the prompt from decreasing user interaction with the online system 140, the online system 140 applies various criteria to the prompt that regulate presentation of the prompt to the user in various embodiments. For example, the online system 140 maintains a threshold duration between presentations of prompts to indicate whether to associate physical locations corresponding to location coordinates received from client devices 110 associated with the user with one or more labels. Hence, the online system 140 determines a time when another prompt to associate a physical locations corresponding to location coordinates received from client devices 110 associated with the user with a label, and provides the prompt to the client device at a time at least the threshold duration from the time when the other prompt was presented to the user. In some embodiments, the online system 140 waits the threshold duration and an additional interval, which may be varied over time, from a time when another prompt was previously presented to the user to provide 340 the prompt to the client device 110 for presentation. Additionally, the online system 140 may increase the threshold duration (e.g., one week) between presentation of prompts to indicate whether to associate physical locations corresponding to location coordinates received from client devices 110 associated with the user with one or more labels in response to receiving an indication from the client device 110 that the user dismissed the prompt. This allows the online system 140 to increase a time interval between presentation of the prompt and an additional prompt to indicate whether to associate physical locations with one or more labels to the user, reducing a likelihood of presentation of the prompt decreasing user interaction with the online system 140. Similarly, the online system 140 may increase the threshold duration between presenting prompts if the online system 140 does not receive a response to the prompt within a specified time interval from a time when the prompt was provided 340 to the client device 110.

Additionally, the online system 140 may account for presentation of prompts to additional users when providing 340 the prompt to the client device 110. Based on information maintained by the online system 140 for the user, the online system 140 identifies one or more additional users connected to the user via the online system 140. The online system 140 retrieves stored information identifying content presented by the online system 140 to the additional users connected to the user. If the online system 140 determines from the retrieved information that the online system 140 previously provided an additional prompt that identified the selected label and requested the additional user to indicate whether to associate the particular physical location with the label, the online system 140 withholds from providing the prompt to the client device 110 for presentation to the user. This allows the online system 140 to leverage prompts presented to additional users connected to the user to limit presentation of prompts to the user while also obtaining information about whether a label identifies the particular physical location.

If the online system 140 receives a response to the prompt from the user, the online system 140 and stores information indicating whether the user was at the physical location identified by the selected label based on the received response. Hence, if the user provides a response to the prompt indicating the user was at the physical location identified by the prompt, the online system 140 stores an indication the user was at the physical location identified by the prompt in association with the label. Additionally, the online system 140 modifies the model that determines a likelihood of location coordinates being identified by the selected label based on the received response. This allows the online system 140 to improve an accuracy of the model determining the likelihood of location coordinates being identified by the selected label based on responses from various users to prompts about whether location coordinates received 305 from client devices 110 associated with the users are identified by the selected label. The online system 140 modifies the model determining the likelihood of location coordinates being identified by the selected label until the model has a minimum accuracy. Subsequently, the online system 140 applies the model to received location coordinates to identify when users are at the physical location identified by the label, allowing the online system 140 to provide a user who specified the label with increased information about online system users who visit the physical location identified by the label. Hence, presenting prompts to users as described above in conjunction with FIG. 3 allows the online system 140 to maintain models that accurately predict likelihoods of various labels identifying different location coordinates, which enables the online system 140 to more readily identify users visiting physical locations identified by labels without the users providing information to the online system 140 indicating they are at a physical location identified by a label.

Figure 4:
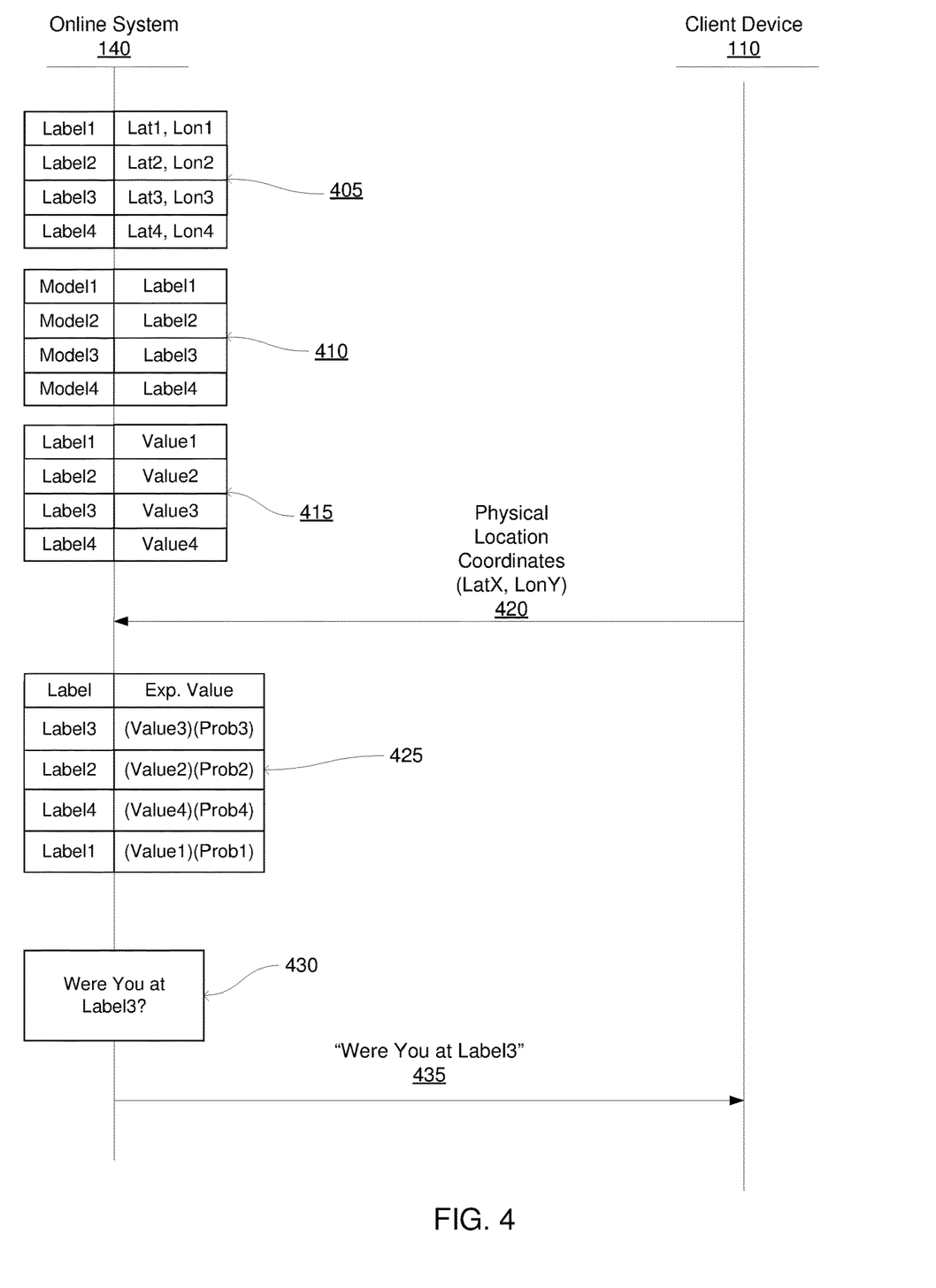
FIG. 4 is an interaction diagram of an online system associating a label identifying a location with location coordinates, in accordance with an embodiment.

FIG. 4 is an interaction diagram of one embodiment of an online system 140 associating a label identifying a physical location with location coordinates. As further described above in conjunction with FIGS. 2 and 3, the online system 140 maintains various labels 405 that each identify a physical location. For example, each label 405 corresponds to location coordinates, such as a latitude and a longitude. Labels 405 may be included in user profiles of users who specify labels 405 and associate physical location coordinates with the labels. A label 405 allows online system users to more easily provide physical location coordinates to the online system 140 by identifying the label to the online system 140, which retrieves physical location coordinates corresponding to the label 405. For example, labels 405 are text strings, allowing a user to identify a text string to the online system 140 rather than identifying a latitude and a longitude.

However, online system users may fail to identify a label 405 to the online system 140 even when the users' physical locations correspond to the location identified by the label 405. For example, a user may physically be at physical location coordinates corresponding to a label 405 with a client device 110, but not identify the label 405 to the online system 140. In a specific example, a client device 110 of a user is at physical location coordinates of a retail location identified by a label 405, but the user does not identify the label 405 to the online system 140. This prevents the online system 140 from maintaining information identifying that the user was at physical location coordinates identified by the label 405. Accordingly, the online system 140 has limited information to provide to a user who specified the label 405. Such limited information prevents the user who specified the label from effectively using information from the online system 140 about users visiting physical location coordinates identified by the label to present content to online system users or to evaluate content presented to online system users.

Even if users do not identify a label 405 to the online system 140, as further described above in conjunction with FIG. 3, many client devices 110 provide the online system 140 with location coordinates of the client device 110 at periodic intervals or when certain criteria are satisfied. The online system 140 maintains one or more models 410 that determine likelihoods of location coordinates received from a client device 110 corresponding to one or more of the labels 405. This allows the online system 140 to identify users who have visited the physical location coordinates identified by a label 405 even when users to not manually identify the label 405 to the online system 140, which increases an amount of information about the label 405 the online system 140 may provide to a user who specified the label 405. However, the online system 140 modifies or refines various models 410 to more accurately identify whether location coordinates received from a client device 110 correspond to physical location coordinates identified by a label 405, so the online system 140 may provide the user specifying a label 405 with accurate information about users who visited physical location coordinates identified by the label 405.

To modify one or more models 410, the online system 140 prompts various users to indicate whether various labels 405 identify location coordinates received from client devices 110 associated with the users. The online system 140 maintains various values 415 to the online system 140 of identifying whether received location coordinates are identified by various labels 405. A value 415 to the online system 140 of determining whether received location coordinates are identified by a label 405 may represent an expected revenue to the online system from a user who specified the label, an expected increase in user interaction with content presented by the online system 140 accounting for the label, or any other suitable value, as further described above in conjunction with FIG. 3.

The online system 140 receives location coordinates 420 from a client device 110 and determines a particular physical location corresponding to the received location coordinates 420. As further described above in conjunction with FIG. 3, the particular physical location that corresponds to location coordinates where the client device 110 remained for at least a threshold amount of time. From the models 410 and values 415, the online system 140 determines expected values 425 to the online system 140 of determining whether location coordinates are identified by various labels 405. For example, the online system 140 applies models 410 corresponding to each label 405 to the particular physical location to determine likelihoods that different labels 405 identify the particular physical location. The online system 140 determines the expected value of determining whether different labels 405 identify the particular physical location as a product of a likelihood of a label 405 identifying the particular physical location and a value 415 to the online system 140 of identifying whether the label 405 identifies location coordinates. As further described above in conjunction with FIG. 3, the online system 140 selects a label 405 based on the expected values 425. In the example of FIG. 4, the online system 140 ranks the labels 405 by their expected values 425 and selects a label 405 having a maximum position in the ranking.

To modify the model 410 determining likelihoods of location coordinates being identified by the selected label 405, the online system 140 generates a prompt 430 identifying the selected label 405 and prompting the user to indicate whether the received location coordinates 420 correspond to a physical location identified by the label 405. For example, the prompt 430 includes information identifying the label and information identifying a time when the online system 140 received the location coordinates 420 and prompts the user to indicate whether the user was at the physical location identified by the selected label 405 at the identified time. The online system 140 transmits 435 the prompt 430 to the client device 110 for presentation to the user. If the online system 140 receives a response to the prompt 430 from the client device 110, the online system 140 modifies the model 410 determining likelihoods of location coordinates being identified by the selected label 405. Hence, based on whether the user indicates the user was or was not at the physical location identified by the prompt 430 at the time identified by the prompt 430, the online system 140 modifies the model 410 determining likelihoods of location coordinates being identified by the selected label 405. As further described above in conjunction with FIG. 3, the online system 140 may account for various information associated with the user when transmitting 435 the prompt 430 to the client device 110 to prevent presentation of the prompt 430 from impairing user engagement with the online system 140.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining labels at an online system, each label comprising a sequence of one or more text strings and identifying a physical location, the physical location described by geographical location coordinates or a geographical address, each maintained label received by the online system from a corresponding user of the online system;
   receiving, at the online system, location coordinates from a client device associated with a viewing user of the online system;
   determining a particular physical location from the received location coordinates, the particular physical location corresponding to location coordinates where the online system determined the client device remained for a least a threshold amount of time;
   retrieving one or more models associated with the maintained labels, a model determining a likelihood of location coordinates identifying the physical location identified by a label;
   determining likelihoods of one or more maintained labels identifying the particular physical location by applying the one or more models to received location coordinates for particular physical location;
   retrieving values to the online system of identifying whether location coordinates received by the online system are identified by each of at least a set of the maintained labels, the retrieved value of a label of the set of the maintained labels based on an expected revenue received by the online system from the corresponding user from whom the online system received the label of the set of the maintained labels;
   selecting a maintained label based on the determined likelihoods and the retrieved values; and
   providing a prompt to the client device for presentation to the viewing user, the prompt identifying the selected maintained label and requesting the viewing user whether to associate the particular physical location with the selected maintained label, wherein providing the prompt to the client device for presentation to the viewing user comprises:
      identifying one or more additional viewing users connected to the viewing user via the online system;
      determining that the online system previously presented an additional prompt to an additional viewing user connected to the viewing user, the presented additional prompt identifying the selected maintained label, and the presented additional prompt requesting the additional viewing user whether to associate the particular physical location with the maintained label; and
      withholding the prompt from the client device in response to the determining.

2. The method of claim 1, further comprising:
   storing an indication that the viewing user was at the physical location identified by the selected maintained label in response to receiving a response to the prompt to associate the particular physical location of the set with the selected maintained label.

3. The method of claim 1, further comprising:
   receiving an indication from the client device that the viewing user dismissed the prompt; and
   increasing a time interval between a time when the prompt was provided to the client device by the online system and a subsequent time when an additional prompt identifying a maintained label and requesting the viewing user whether to associate an additional physical location with one of the maintained label in response to receiving the indication.

4. The method of claim 1, wherein providing the prompt to the client device for presentation to the viewing user comprises:
   determining a time when an additional prompt was previously presented to the viewing user, the additional prompt identifying another maintained label, and the additional prompt requesting the viewing user whether to associate another physical location set with the other maintained label;
   determining an additional time at least a threshold duration from the determined time; and
   providing the prompt to the client device for presentation to the viewing user at the additional time.

5. The method of claim 1, wherein determining the particular physical location from the received location coordinates comprises:
   retrieving physical coordinates received within a specific time interval;
   determining a centroid of the retrieved physical coordinates; and
   including the centroid of the retrieved location coordinates in the set in response to an average distance between the retrieved physical coordinates and the centroid being less than a threshold distance.

6. The method of claim 1, wherein determining the particular physical location from the retrieved physical locations comprises:
   retrieving a user profile maintained by the online system for the viewing user;
   identifying physical location coordinates included in the user profile of the viewing user; and
   discarding physical locations corresponding to location coordinates within a threshold distance of physical location coordinates included in the user profile as the particular physical location.

7. The method of claim 1, wherein selecting the maintained label based on the determined likelihoods and the retrieved values comprises:
   determining an expected value for each maintained label of the set, the expected value for the maintained label based on a likelihood of the maintained label identifying the particular physical location and the expected revenue received by the online system from the corresponding user from whom the online system received the maintained label of the set of the maintained labels for identifying whether location coordinates are identified by the maintained label; and
   selecting the maintained label based on the expected values.

8. The method of claim 7, wherein selecting the maintained label based on the expected values comprises:
   ranking the maintained labels based on the expected values; and
   selecting a maintained label having at least a threshold position in the ranking.

9. The method of claim 7, wherein selecting the maintained label based on the expected values comprises:

selecting a maintained label having at least a threshold expected value.

10. A computer program product comprising a non-transitory computer readable medium having instructions encoded thereon that, when executed by a processor, cause the processor to:
   maintain labels at an online system, each label associated with a corresponding user comprising a sequence of one or more text strings and identifying a physical location, the physical location described by geographical location coordinates or a geographical address, each maintained label received by the online system from a corresponding user of the online system;
   receive, at the online system, location coordinates from a client device associated with a viewing user of the online system;
   determine a particular physical location from the received location coordinates, the particular physical location corresponding to location coordinates where the online system determined the client device remained for a least a threshold amount of time;
   retrieve one or more models associated with the maintained labels, a model determining a likelihood of location coordinates identifying the physical location identified by a label;
   determine likelihoods of one or more maintained labels identifying the particular physical location by applying the one or more models to received location coordinates for particular physical location;
   retrieve values to the online system of identifying whether location coordinates received by the online system are identified by each of at least a set of the maintained labels, the retrieved value of a label of the set of maintained labels based on an expected revenue received by the online system from the corresponding user from whom the online system received the label of the set of the maintained labels;
   select a maintained label based on the determined likelihoods and the retrieved values; and
   provide a prompt to the client device for presentation to the viewing user, the prompt identifying the selected maintained label and requesting the viewing user whether to associate the particular physical location with the selected maintained label, wherein provide the prompt to the client device for presentation to the viewing user comprises:
      identify one or more additional viewing users connected to the viewing user via the online system;
      determine that the online system previously presented an additional prompt to an additional viewing user connected to the viewing user, the presented additional prompt identifying the selected maintained label, and the presented additional prompt requesting the additional viewing user whether to associate the particular physical location with the maintained label; and
      withhold the prompt from the client device in response to the determining.

11. The computer program product of claim 10, wherein the computer readable storage medium further has instructions encoded thereon that, when executed by the processor, cause the processor to:
   store an indication that the viewing user was at the physical location identified by the selected maintained label in response to receiving a response to the prompt to associate the particular physical location of the set with the selected maintained label.

12. The computer program product of claim 10, wherein the computer readable storage medium further has instructions encoded thereon that, when executed by the processor, cause the processor to:
   receive an indication from the client device that the viewing user dismissed the prompt; and
   increase a time interval between a time when the prompt was provided to the client device by the online system and a subsequent time when an additional prompt identifying a maintained label and requesting the viewing user whether to associate an additional physical location with one of the maintained label in response to receiving the indication.

13. The computer program product of claim 10, wherein provide the prompt to the client device for presentation to the viewing user comprises:
   determine a time when an additional prompt was previously presented to the viewing user, the additional prompt identifying another maintained label, and the additional prompt requesting the viewing user whether to associate another physical location set with the other maintained label;
   determine an additional time at least a threshold duration from the determined time; and
   provide the prompt to the client device for presentation to the viewing user at the additional time.

14. The computer program product of claim 10, wherein determine the particular physical location from the received location coordinates comprises:
   retrieve location coordinates received within a specific time interval;
   determine a centroid of the retrieved location coordinates; and
   include the centroid of the retrieved location coordinates in the set in response to an average distance between the retrieved location coordinates and the centroid being less than a threshold distance.

15. The computer program product of claim 10, wherein determine the particular physical location from the retrieved physical locations comprises:
   retrieve a user profile maintained by the online system for the viewing user;
   identify physical location coordinates included in the user profile of the viewing user; and
   discard physical locations corresponding to physical location coordinates within a threshold distance of physical location coordinates included in the user profile as the particular physical location.

16. The computer program product of claim 10, wherein select the maintained label based on the determined likelihoods and the retrieved values comprises:
   determine an expected value for each maintained label of the set, the expected value for the maintained label based on a likelihood of the maintained label identifying the particular physical location and the expected revenue received by the online system from the corresponding user from whom the maintained label of the set of labels was received for identifying whether location coordinates are identified by the maintained label; and
   select the maintained label based on the expected values.

17. The computer program product of claim 16, wherein select the maintained label based on the expected values comprises:
   rank the maintained labels based on the expected values; and select a maintained label having at least a threshold position in the ranking.

18. The computer program product of claim 16, wherein select the maintained label based on the expected values comprises:

select a maintained label having at least a threshold expected value.

* * * * *

UNITED STATES PATENT AND TRADEMARK OFFICE
CERTIFICATE OF CORRECTION

PATENT NO. : 11,093,555 B2
APPLICATION NO. : 15/640374
DATED : August 17, 2021
INVENTOR(S) : Parthasarathy et al.

Page 1 of 1

It is certified that error appears in the above-identified patent and that said Letters Patent is hereby corrected as shown below:

In the Claims

In Column 21, Claim 1, Line 24, delete "a least" and insert -- at least --, therefor.

In Column 23, Claim 10, Lines 20-21, delete "a least" and insert -- at least --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*